(12) United States Patent
Wu et al.

(10) Patent No.: US 9,163,139 B2
(45) Date of Patent: Oct. 20, 2015

(54) EXTENDED FILM AND THE MANUFACTURING METHOD THEREOF

(71) Applicant: INDUSTRIAL TECHNOLOGY RESEARCH INSTITUTE, Hsinchu (TW)

(72) Inventors: Chien-Pang Wu, Hsinchu (TW); Jyh-Horng Wu, Hsinchu (TW); Kuo-Chen Shih, Hsinchu (JP); Chi-Yuan Hung, Hsinchu (TW); Chia-Hao Li, Hsinchu (TW); Yao-Zu Wu, Hsinchu (TW); Chuh-Yung Chen, Hsinchu (TW)

(73) Assignee: INDUSTRIAL TECHNOLOGY RESEARCH INSTITUTE, Hsinchu County (TW)

( * ) Notice: Subject to any disclaimer, the term of this patent is extended or adjusted under 35 U.S.C. 154(b) by 394 days.

(21) Appl. No.: 13/727,522

(22) Filed: Dec. 26, 2012

(65) Prior Publication Data

US 2014/0107294 A1    Apr. 17, 2014

(30) Foreign Application Priority Data

Oct. 16, 2012    (TW) .............................. 101138035 A

(51) Int. Cl.
| | | |
|---|---|---|
| C08L 53/00 | (2006.01) | |
| C08J 5/18 | (2006.01) | |
| C08L 67/00 | (2006.01) | |
| C08L 67/04 | (2006.01) | |

(52) U.S. Cl.
CPC .. *C08L 53/00* (2013.01); *C08J 5/18* (2013.01); *C08L 67/00* (2013.01); *C08L 67/04* (2013.01)

(58) Field of Classification Search
None
See application file for complete search history.

(56) References Cited

U.S. PATENT DOCUMENTS

| | | | |
|---|---|---|---|
| 5,443,780 A * | 8/1995 | Matsumoto et al. ....... | 264/290.2 |
| 7,144,634 B2 | 12/2006 | Rosenbaum et al. | |
| 7,846,517 B2 | 12/2010 | McDaniel | |
| 2008/0262146 A1 | 10/2008 | Yonezawa et al. | |
| 2010/0013121 A1 * | 1/2010 | Hashimoto et al. ........ | 264/290.2 |
| 2011/0163101 A1 | 7/2011 | Deng | |
| 2011/0224342 A1 | 9/2011 | Masuda et al. | |
| 2011/0244186 A1 | 10/2011 | Dou et al. | |
| 2011/0269890 A1 | 11/2011 | Scheer et al. | |

FOREIGN PATENT DOCUMENTS

| | | |
|---|---|---|
| CN | 101608349 A | 12/2009 |
| CN | 102344537 A | 2/2012 |
| TW | 200508294 | 3/2005 |
| TW | I285211 | 8/2007 |
| TW | 2010030090 A | 8/2010 |
| WO | WO 2010/138081 A1 | 12/2010 |
| WO | WO 2010/140041 A1 | 12/2010 |

OTHER PUBLICATIONS

Chapleau et al., "Biaxial Orientation and Properties of Polyactide/Thermoplastic Starch Blends," Annual Technical Conf., ANTEC, pp. 1-7 (2011).
Li et al., "Effect of Chain Extension on the Properties of PLA/TPS Blends," J. of Appl. Polymer Science, vol. 122, pp. 134-141 (2011).
Tsai et al., "Crystallinity and Dimensional Stability of Biaxial Oriented Poly(lactic acid) Films," Polymer Degradation and Stability, vol. 95,pp. 1292-1298 (2010).
Najafi et al., "Polyactide (PLA)-Clay Nanocomposites Prepared by Melt Compounding in the Presence of a Chain Extender," Composites Sci & Tech., vol. 72, pp. 608-615 (2012).
Meng et al., "Control of Thermal Degradation of Polyactide/clay Nanocomposites During Melt Processing by Chain Extension Reaction," Polymer Degradation and Stability, pp. 1-11 (2012).
Najafi et al., "Control of Thermal Degradation of Polyactide (PLA)-Clay Nanocomposites Using Chain Extenders," Polymer Degradation and Stability, vol. 97, pp. 554-565 (2012).
Yu-Hsiang Hu, et al., "Living Polymerization of Styrene Initiated by Mercaptan/ϵ-Caprolactam", Journal of Polymer Science: Part A: Polymer Chemistry, vol. 42, Iss. 19, pp. 4976-4993, 2004.

* cited by examiner

*Primary Examiner* — Jeffrey Mullis
(74) *Attorney, Agent, or Firm* — Muncy, Geissler, Olds & Lowe, P.C.

(57) ABSTRACT

An extended film and a manufacturing method thereof are provided. The extended film includes a poly(lactic acid) and a block copolymer, wherein the block polymer includes a first block, a second block and a third block that connected with each other by chemical bonds. The extended film is formed by steps of mixing poly(lactic acid) and the block copolymer to form a mixture, compressing the mixture to form a board body and extending the board body to form an extended film, thereby forming an extended film having properties of high thermal-resistance and high transparency, the film thus obtained is applicable for packaging use.

15 Claims, 5 Drawing Sheets

EXTENDED FILM AND THE MANUFACTURING METHOD THEREOF

CROSS-REFERENCE TO RELATED APPLICATION

The present application is based on, and claims priority from, Taiwan (International) Application Serial Number 101138035, filed Oct. 16, 2012, the disclosure of which is hereby incorporated by reference herein.

BACKGROUND

1. Technical Field

The present disclosure generally relates to an extended film. More specifically, the present disclosure relates to an extended film applicable for a packaging material.

2. Description of Related Art

Issues of environmental pollution have been concerned and alternatives of petrochemical material have been sought for a long time. Especially, with the dramatical change in global weather and skyrocketing in petroleum price, nations worldwide have put in a lot resources to search for the solution of the above issues.

Poly(lactic acid), PLA, is an aliphatic polyester having a good bio-degradable property. Poly(lactic acid) does not cause environmental pollution and can be used to substitute the traditional petrochemical plastics since the poly(lactic acid) is produced from natural starch rather than the traditional petrochemical material. Thus poly(lactic acid) is an ECO-friendly material under development. Recently, the poly(lactic acid) material has price down to NTD $70 to $110/kg due to many international industries have involved in the production of poly(lactic acid). Poly(lactic acid) has an advantage of substituting traditional petrochemical plastic material compared to other bio-plastic material from the view of cost consideration. Although poly(lactic acid) has the above advantages, there are still problems existing in poly(lactic acid) structures themselves which need to be improved such as slow crystallization speed, low thermal-resistance and hydrolysis phenomenon trends to occur during melt processing.

Therefore, the improvement of the thermal-resistance, transparence and mechanical properties of the poly(lactic acid) is useful in the application of packaging material.

SUMMARY

The present disclosure provides an extended film including poly(lactic acid); and a block copolymer including a first block having a segment formed by a styrene repeating unit, a second block having a segment formed by at least one repeating unit selected from the group consisting of acrylate repeating units and methacrylate repeating units, and a third block having a segment formed by an ethylenical repeating unit, wherein the first block, the second block and the third block are connected by chemical bonds.

The present disclosure further provides a method of manufacturing an extended film including the steps of mixing polylactic acid) and block copolymer to form a mixture; compressing the mixture to form a thin plate; and extending the thin plate to form an extended film.

DETAILED DESCRIPTION

Figure 1:
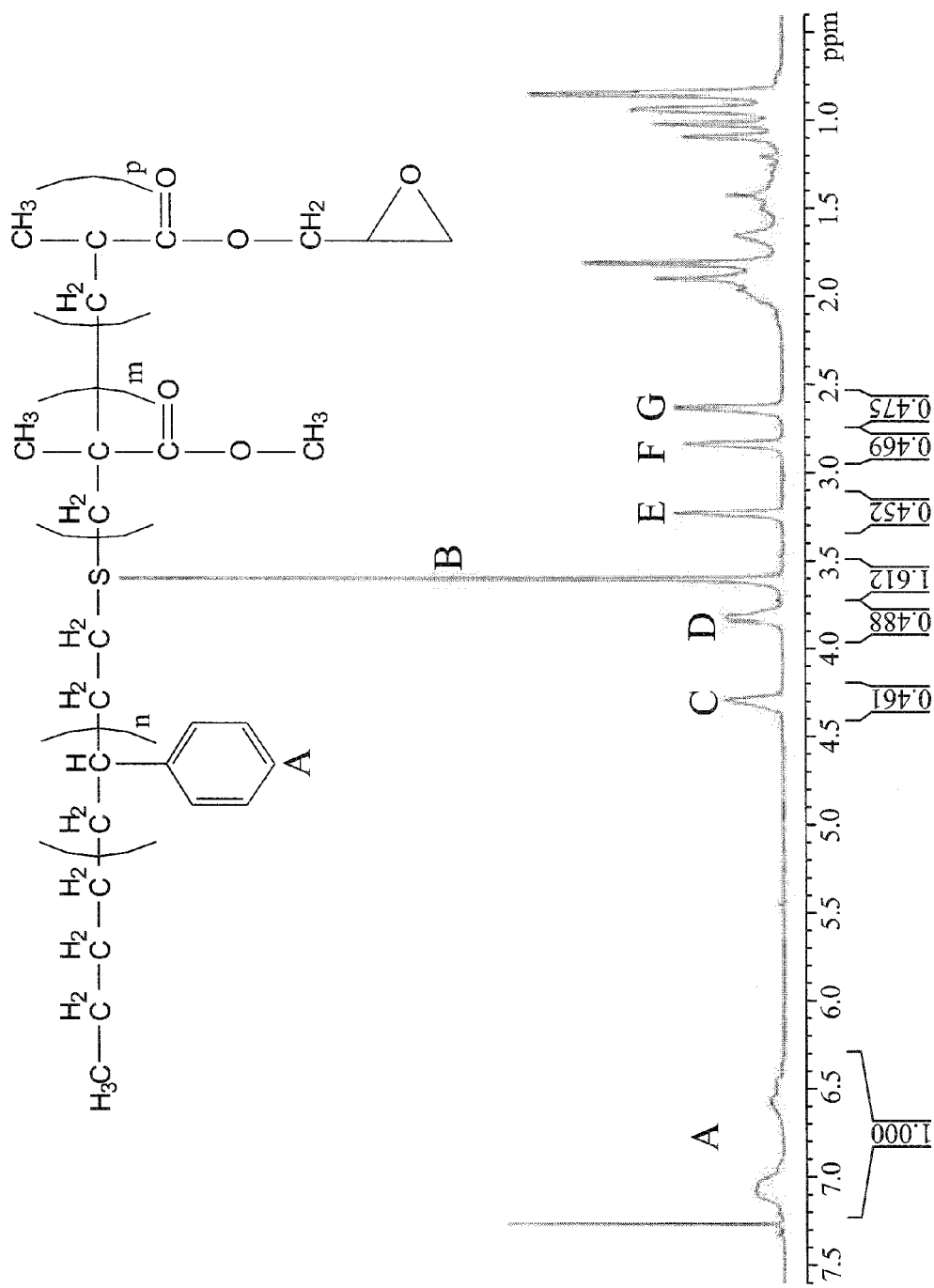
FIG. 1 shows 1HNMR analysis of the block copolymer of the disclosure.

In the following detailed description, for purposes of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing.

As used herein, the terms "first", "second" and "third" are provided for a person skilled in the art understanding and reading accompanying with the content disclosed in the specification, and are not intended to limit the given conditions or sequence, and the change or adjustment of the corresponding relationship should be considered fall in the scope of the disclosure without substantive change of technical contents.

As used herein, the terms "a" or "an" are employed to describe elements and components of the disclosure. Those terms should be read to include one or at least one and the singular also includes the plural unless it is obvious that it is meant otherwise.

In one embodiment, the disclosure provides an extend film including poly(lactic acid), and a block copolymer including a first block having segments formed by a styrene repeating unit; a second block having segments formed by at least one repeating unit selected from the group consisting of acrylate repeating units and methacrylate repeating units; and a third block having segments formed by an ethylenical repeating unit having epoxy groups, wherein the first block, the second block and the third block are connected by chemical bonds.

The block copolymer of the disclosure means a polymer product of monomers, that is, a polymer formed by polymerizing a first block, a second block and a third block. The monomers include styrene monomers, acrylate monomers, methacrylate monomers and ethylenical monomers having epoxy group. Specifically, the first block may be synthesized first, and the second block and the third block are prepared, then the first block may be selected to polymerizing the second block and the third block sequentially, or to polymerizing the third block and the second block sequentially.

As used herein, the term "a segment formed by styrene repeating units" means a segment formed by polymerizing plural styrene monomers. The first block includes the segment.

As used herein, the term "a segment formed by at least one repeating unit selected from the group consisting of acrylate repeating units and methacrylate repeating units" means a segment formed by polymerizing plural acrylate monomers or plural methacrylate monomers or monomers including plural such polymerizable groups.

As used herein, the term "a segment formed by ethylenical repeating units having epoxy groups" means a segment formed by polymerizing plural ethylenical monomers having epoxy groups.

In one embodiment, the block copolymer includes the structure represented by formula (I):

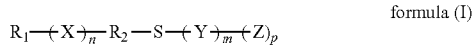

formula (I)

wherein $R_1$ represents a $C_1$-$C_8$ alkyl, $R_2$ represents a $C_2$-$C_6$ alkylene, X represents a styrene repeating unit, Y represents at least one repeating unit selected from the group consisting of acrylate repeating units and methacrylate repeating units, Z represents an ethylenical repeating unit having epoxy groups, n represents an integer of 10 to 30, m represents an integer of 10 to 100, and p represents an integer of 10 to 100.

In another embodiment, the block copolymer includes the structure represented by formula (II):

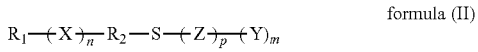

formula (II)

wherein $R_1$ represents a $C_1$-$C_8$ alkyl, $R_2$ represents a $C_2$-$C_6$ alkylene, X represents a styrene repeating unit, Y represents at least one repeating unit selected from the group consisting of acrylate repeating units and methacrylate repeating units, Z represents an ethylenical repeating unit having epoxy groups, n represents an integer of 10 to 30, m represents an integer of 10 to 100, and p represents an integer of 10 to 100.

Examples of $C_1$-$C_8$ alkyl include methyl, ethyl, propyl iso-propyl, butyl, pentyl, hexyl, heptyl and octyl. Examples of $C_2$-$C_6$ alkylene include ethylene, propylene and butylene.

In one exemplary embodiment, the styrene repeating units are formed from at least one monomer selected from the group consisting of styrene, α-methyl styrene, m-methyl styrene, o-methyl styrene, p-methyl styrene, o-ethyl styrene, p-ethyl styrene and p-tert-butyl styrene.

The acrylate repeating units are formed by at least one monomer selected from the group consisting of methyl acrylate, ethyl acrylate, n-propyl acrylate, n-butyl acrylate, tert-butyl acrylate, n-hexyl acrylate, cyclohexyl acrylate, 2-ethylhexyl acrylate, lauryl acrylate, isobornyl acrylate, cyclododecyl acrylate, chloromethyl acrylate, 2-chloroethyl acrylate, 2-hydroxyethyl acrylate, 3-hydroxypropyl acrylate, 2,3,4,5,6-pentahydroxyhexyl acrylate, and 2,3,4,5-tetrahydroxypentyl acrylate.

The methacrylate repeating units are formed by at least one monomer selected from the group consisting of methyl methacrylate, ethyl methacrylate, n-propyl methacrylate, n-butyl methacrylate, tert-butyl methacrylate, n-hexyl methacrylate, cyclohexyl methacrylate, 2-ethylhexyl methacrylate, lauryl methacrylate, isobornyl methacrylate, cyclododecyl methacrylate, chloromethyl methacrylate, 2-chloroethyl methacrylate, 2-hydroxyethyl methacrylate, 3-hydroxypropyl methacrylate, 2,3,4,5,6-pentahydroxyhexyl methacrylate, and 2,3,4,5-tetrahydroxypentyl methacrylate.

The ethylenical repesting units having epoxy groups are formed by at least one monomer selected from the group consisting glycidyl acrylate (GA), glycidyl methacrylate (GMA), glycidyl ethylacrylate and glycidyl itaconate.

In a still embodiment, the block copolymer includes the structure represented by formula (III):

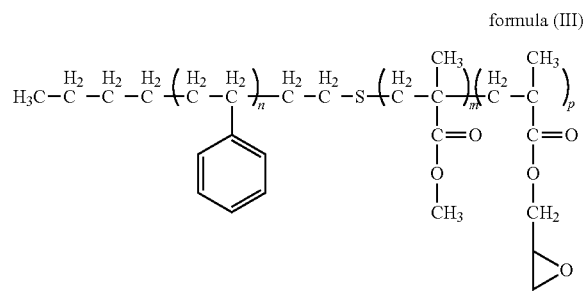

formula (III)

wherein n represents an integer of 10 to 30, m represents an integer of 10 to 100 and p represents an integer of 10 to 100.

Generally, the glass transition temperature of poly(lactic acid) is about 60° C. According to the examples, the extended film of the disclosure has a glass transition temperature of 90 to 112° C., and this is of high thermal-resistance. According to another examples, the total transmittance of the extended film of the disclosure is 90 to 93%.

In the examples of the disclosure, the method of manufacturing the extended film includes the steps of: mixing poly (lactic acid) and a block copolymer to form a mixture; compressing the mixture to form a thin plate; and extending the thin plate to form an extended film, wherein the block copolymer includes a first block having segments formed by a styrene repeating unit; a second block having segments formed by at least one repeating unit selected from the group consisting of acrylate repeating units and methacrylate repeating units; and a third block having a segment formed by an ethylenical repeating unit having epoxy groups, and the first block, the second block and the third block are connected by chemical bonds.

In the step of mixing poly(lactic acid) and the block copolymer, the addition amount of the block copolymer is between 0.5 to 5 weight % based on the total weight of the poly(lactic acid) and the block copolymer.

In one embodiment, the mixture of the polylactic acid) and the block copolymer is compressed to form a thin plate having a thickness of 0.1 to 10 mm.

In the step of extending the thin plate to form an extended film, extending process by uniaxial stretch or biaxial stretch may be used, or extending process by uniaxial secondary stretch or biaxial oriented stretch may be used. Generally, the length and width of the thin plate may be extended 1 to 10 times. In one embodiment, the extended film is formed at an extending temperature of 60 to 90° C. and at an extending rate of 10 to 70 cm/second.

The block copolymer having a structure represented by formula (I) may be formed:

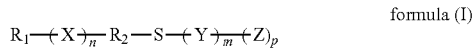

formula (I)

or a block copolymer having a structure represented by formula (II) may be formed:

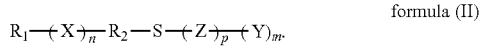

formula (II)

In formula (I) and formula (II), $R_1$ represents a $C_1$-$C_8$ alkyl, $R_2$ represents a $C_2$-$C_6$ alkylene, X represents a styrene repeating unit, Y represents at least one repeating unit selected from the group consisting of acrylate repeating units and methacrylate repeating units, Z represents an ethylenical repeating unit having epoxy groups, n represents an integer of 10 to 30, m represents an integer of 10 to 100, and p represents an integer of 10 to 100; wherein examples of $C_1$-$C_8$ alkyl are such as methyl, ethyl, propyl, iso-propyl, butyl, pentyl, hexyl, heptyl and octyl; examples of $C_2$-$C_6$ alkylene are such as ethylene, propylene and butylenes.

For example, the styrene repeating units are formed from at least one monomer, but not limited to, selected from the group consisting of styrene, α-methyl styrene, m-methyl styrene, o-methyl styrene, p-methyl styrene, o-ethyl styrene, p-ethyl styrene and p-tert-butyl styrene.

The acrylate repeating units are formed by at least one monomer, but not limited to, selected from the group consisting of methyl acrylate, ethyl acrylate, n-propyl acrylate, n-butyl acrylate, tert-butyl acrylate, n-hexyl acrylate, cyclohexyl acrylate, 2-ethylhexyl acrylate, lauryl acrylate, isobornyl acrylate, cyclododecyl acrylate, chloromethyl acrylate, 2-chloroethyl acrylate, 2-hydroxyethyl acrylate, 3-hydroxypropyl acrylate, 2,3,4,5,6-pentahydroxyhexyl acrylate, and 2,3,4,5-tetrahydroxypentyl acrylate.

The methacrylate repeating units are formed by at least one monomer, but not limited to, selected from the group consisting of methyl methacrylate, ethyl methacrylate, n-propyl methacrylate, n-butyl methacrylate, tert-butyl methacrylate, n-hexyl methacrylate, cyclohexyl methacrylate, 2-ethylhexyl methacrylate, lauryl methacrylate, isobornyl methacrylate, cyclododecyl methacrylate, chloromethyl methacrylate, 2-chloroethyl methacrylate, 2-hydroxyethyl methacrylate, 3-hydroxypropyl methacrylate, 2,3,4,5,6-pentahydroxyhexyl methacrylate, and 2,3,4,5-tetrahydroxypentyl methacrylate.

The ethylenical repesting units having epoxy groups are formed by at least one monomer, but not limited to, selected from the group consisting glycidyl acrylate (GA), glycidyl methacrylate (GMA), glycidyl ethylacrylate and glycidyl itaconate.

In one embodiment of manufacturing the extended film of the disclosure, a block copolymer having structure represented by formula (HI) is exemplarily formed:

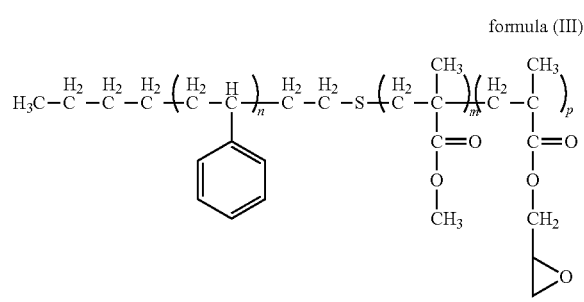

formula (III)

wherein n represents an integer of 10 to 30, m represents an integer of 10 to 100 and p represents an integer of 10 to 100.

In the present disclosure, the block copolymer is added into poly(lactic acid) and the extending process is performed, so as to enhance thermal-resistance, transparency and mechanical properties of the poly(lactic acid), and the extended film of the poly(lactic acid) thus obtained has high thermal-resistance and high transparency, and may be applied as an alternative of one-off packaging material, such as the application of thermal-resistance packaging material or disposable shrinking film.

The features and effectiveness of the disclosure will be further explained by specific examples, but will not be intended to limit the scope of the disclosure.

EXAMPLES

Preparation Example 1

Synthesis of the Block Copolymer Represented by Formula (III)

First, 1000 mL of purified toluene was charged into a reactor and stirred and 400 g of purified styrene was added into the reactor through a syringe, the temperature was raised to 40° C., and 100 mL of n-butyl lithium/n-hexane starting solution was added therein. The active reaction mixture is in bright red color. After the reaction was performed for 2 hours at 40° C., ethylene sulfide was added into the active reaction mixture, and the active reaction mixture was converted into pale yellow color. After the reaction was performed for 2 hours at 40° C., 10 weight % of hydrochloride solution was injected to terminate the reaction. This is the first block of the block copolymer, and the product thus obtained is a polystyrene having terminal thiol group, Mn=2,900 g/mol, Mw=3,100 g/mol, PDI=1.08(GPC).

Then, according to the polymerization method disclosed in reference (Journal of Polymer Science: Part A: Polymer Chemistry, 42, 4976, 2004), parts of the first block product of the block copolymer was reacted with 640 g of methyl methacrylate monomers at a first stage of polymerization, and then reacted with 600 g of glycidyl methacrylate at a second stage of polymerization, and a block copolymer product having a structure represented by formula (III) of the disclosure was obtained, Mn=23,100, Mw=45,840, PDI=1.92. By $^1$HNMR analysis (shown as FIG. 1), the block copolymer product has a ratio of polystyrene (n=27)/methyl methacrylate (m=72.6)/glycidyl methacrylate (p=64) being 1/2.69/2.37, and the epoxy equivalence is 301 g/mol.

Preparation Example 2

Manufacturing Extended Film

To dried poly(lactic acid) (Nature works 4032D) resin particles, 1 weight % of block copolymer synthesized in Preparation Example 1 was added. After thoroughly mixing, a transparent evenly poly(lactic acid) thin plate having a thickness of 10 mm was formed by melt blending using extruder (Type: coperion ZSK 26, Coperion Werner & Pfleiderer, Germany). The processing condition of the extruder was set at a screw speed of 500 rpm and a processing temperature of 170 to 210° C.

Then, the poly(lactic acid) plate was subjected to various heat extending process by using a stretching apparatus (Bruckner KARO IV), to prepare extended films from the various heat extending processes.

Uniaxial stepwise stretch or biaxial oriented stretch may be performed at the extending temperature of 70° C., and the extending rate of 100%/second, and the extension percentages are 100%, 200% and 300%. Hereinafter, the extended films obtained from uniaxial stepwise stretch were represented as (3×1), (3×2) and (3×3), respectively. That is, the uniaxial stretch is performed by 300% (MD direction), and then the uniaxial stretch is performed by 100%, 200% and 300% (TD direction). The extended films obtained by biaxial oriented stretch are represented as (2×2) and (3×3), respectively for biaxial oriented stretch by 200% and by 300%.

Comparative Example 1

The similar process of preparation Example 2 was performed except no addition of block copolymer of the disclosure to the poly(lactic acid) plate.

Hereinafter, the poly(lactic acid) plate without addition of block copolymer of Comparative Example 1 is defined as PLA (4032D Mw=52,000 g/mol), and the poly(lactic acid) plate with the addition of block copolymer of the disclosure is defined as PLA-CE (Mn=23,100 g/mol, Mw=45,840, PDI=1.92.)

Test Example 1

Test of Mechanical Properties of the Extended Film

Figure 2:
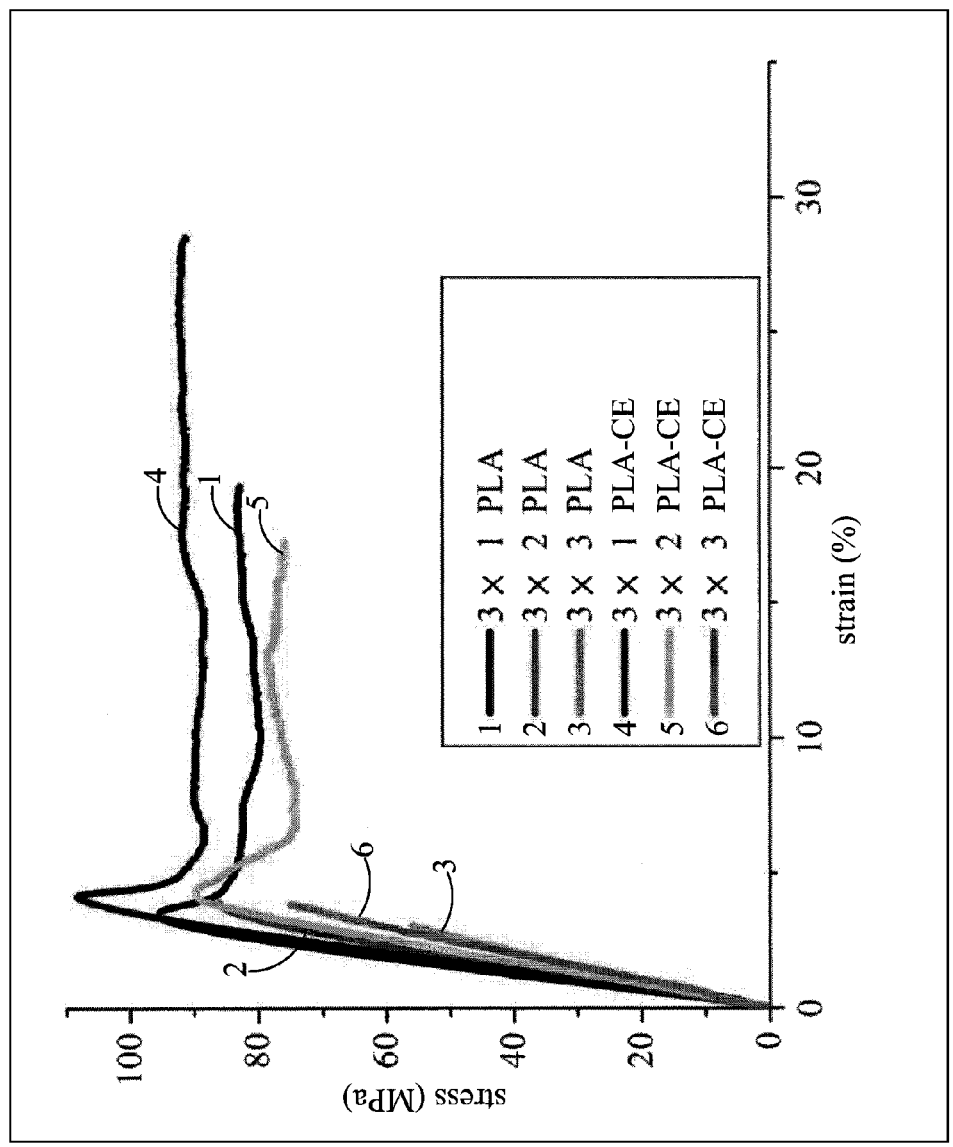
FIG. 2 shows the stress and strain curves of PLA extended films and PLA-CE extended films made by uniaxial stepwise stretch.
Figure 3:
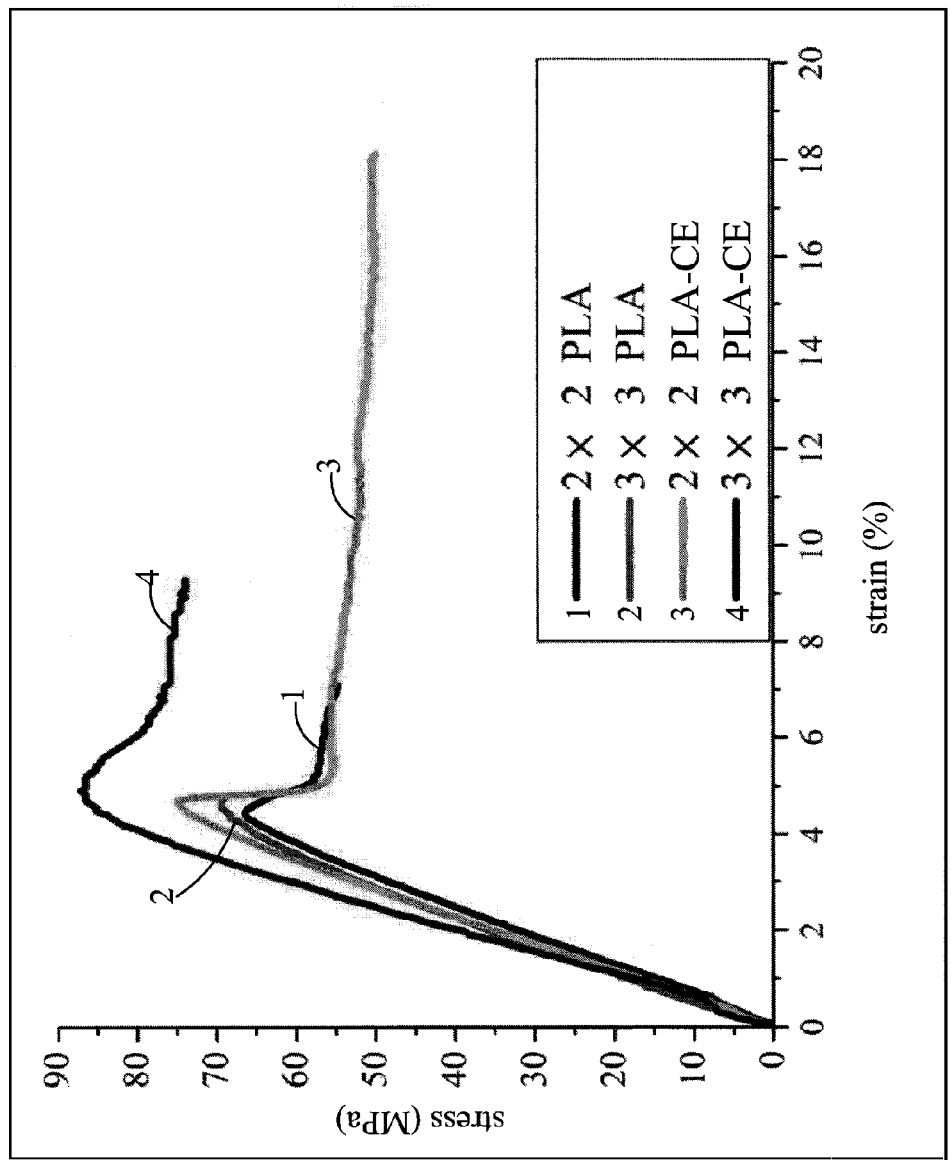
FIG. 3 shows the stress and strain curves of PLA extended films and PLA-CE extended films made by biaxial oriented stretch.

The produced film is forward to analysis of mechanical properties by using Tensile Testing Machine and Dynamic Mechanical Analyzer (DMA). The Tensile Testing Machine is operated at room temperature and a tensile rate 500 mm/min. The operating condition of the Dynamic Mechanical Analyzer is as follows: control strain mode: 0.1%, fixed frequency: 1 Hz, temperature rising rate: 3° C./min, from 0° C. to 140° C. The curves of the stress and strain of the tensile test of the PLA extended films and PLA-CE extended film either made by uniaxial stepwise stretch or biaxial oriented stretch are shown in FIG. 2 and FIG. 3.

The mechanical properties measured from the extended films either made by uniaxial stepwise stretch or biaxial oriented stretch at different extending folds are summarized in Table 1 below.

TABLE 1

| Sample | Storage modulus (MPa)$^a$ | Tg (° C.)$^a$ | Yield Strength (MPa)$^b$ | Breaking Strength (MPa)$^b$ | Extended rate (%)$^b$ |
|---|---|---|---|---|---|
| 3 × 1 PLA | 3,082 | 89.6 | 95.58 | 82.85 | 19.31 |
| 3 × 2 PLA | 2,378 | 90.7 | NA | 86.10 | 3.89 |
| 3 × 3 PLA | 1,945 | 92.8 | NA | 56.13 | 3.05 |
| 3 × 1 PLA-CE | 3,351 | 107.2 | 108.41 | 91.38 | 28.49 |
| 3 × 2 PLA-CE | 2,614 | 109.1 | 89.76 | 75.92 | 17.16 |
| 3 × 3 PLA-CE | 2,079 | 111.6 | NA | 74.97 | 3.84 |
| 2 × 2 PLA | 1,722 | 89.7 | 69.42 | 68.87 | 7.06 |
| 3 × 3 PLA | 1,699 | 91.4 | 66.44 | 50.03 | 4.77 |
| 2 × 2 PLA-CE | 2,138 | 104.2 | 87.13 | 74.97 | 18.1 |
| 3 × 3 PLA-CE | 1,797 | 106.5 | 75.04 | 54.65 | 9.29 |

$^a$measure results of dynamic mechanical analysis
$^b$measure results of tensile test machine From Table 1, the storage modulus, glass transition temperature (Tg), yield strength, breaking strength and extending rate of the PLA-CE plate of the disclosure after the stretch process of either uniaxial stepwise stretch or biaxial oriented stretch, are significantly improved compared to the PLA plate without the addition of the block copolymer.

Test Example 2

The crystal degree and thermal properties of thus produced extended films are analyzed by using Differential Scanning calorimeter (DSC), and the total transmittance (TT) is analyzed by using haze meter. The results are summarized in Table 2 below.

TABLE 2

| Sample | Cold-Crystal Temperature (° C.) | Cold-Crystal (J/g) | Melt-Crystal Temperature (° C.) | Melt-Crystal (J/g) | Crystal Degree (%) | Total Transmittance TT (%) |
|---|---|---|---|---|---|---|
| 3 × 1 PLA | 74.78 | 4.48 | 165.90 | 46.84 | 45.50 | 90.23 |
| 3 × 2 PLA | 72.79 | 9.98 | 166.39 | 47.21 | 39.99 | 90.05 |
| 3 × 3 PLA | 74.83 | 16.35 | 166.84 | 43.77 | 29.45 | 86.79 |
| 3 × 1 PLA-CE | NA | NA | 166.43 | 48.39 | 51.98 | 90.67 |
| 3 × 2 PLA-CE | NA | NA | 167.19 | 46.84 | 50.31 | 90.98 |
| 3 × 3 PLA-CE | NA | NA | 166.47 | 41.01 | 44.05 | 91.04 |
| 2 × 2 PLA | 74.12 | 15.60 | 168.68 | 43.64 | 30.12 | 92.35 |
| 3 × 3 PLA | 77.08 | 6.64 | 167.90 | 43.14 | 39.21 | 89.14 |
| 2 × 2 PLA-CE | NA | NA | 167.74 | 44.16 | 47.43 | 93.36 |
| 3 × 3 PLA-CE | NA | NA | 167.46 | 49.53 | 53.20 | 93.72 |

From the results of Table 2, the crystal degree (melt temperature) and thermal property (crystal degree) of the PLA-CE plate of the disclosure are superior to the PLA plate without the addition of the block copolymer.

Figure 4:
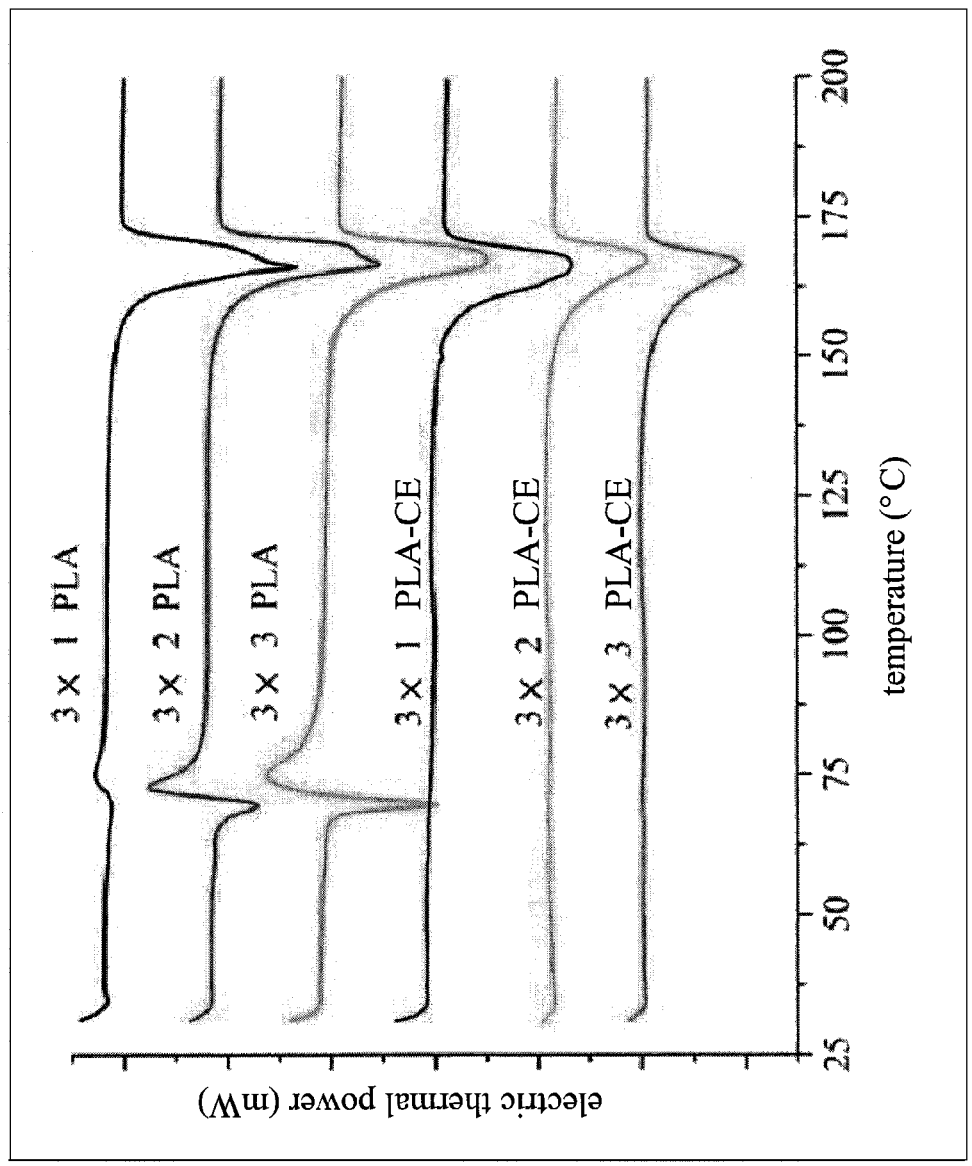
FIG. 4 shows DSC temperature rising curve of PLA extended films and PLA-CE extended films made from a uniaxial stepwise stretch process under isothermal crystallization at different temperatures.
Figure 5:
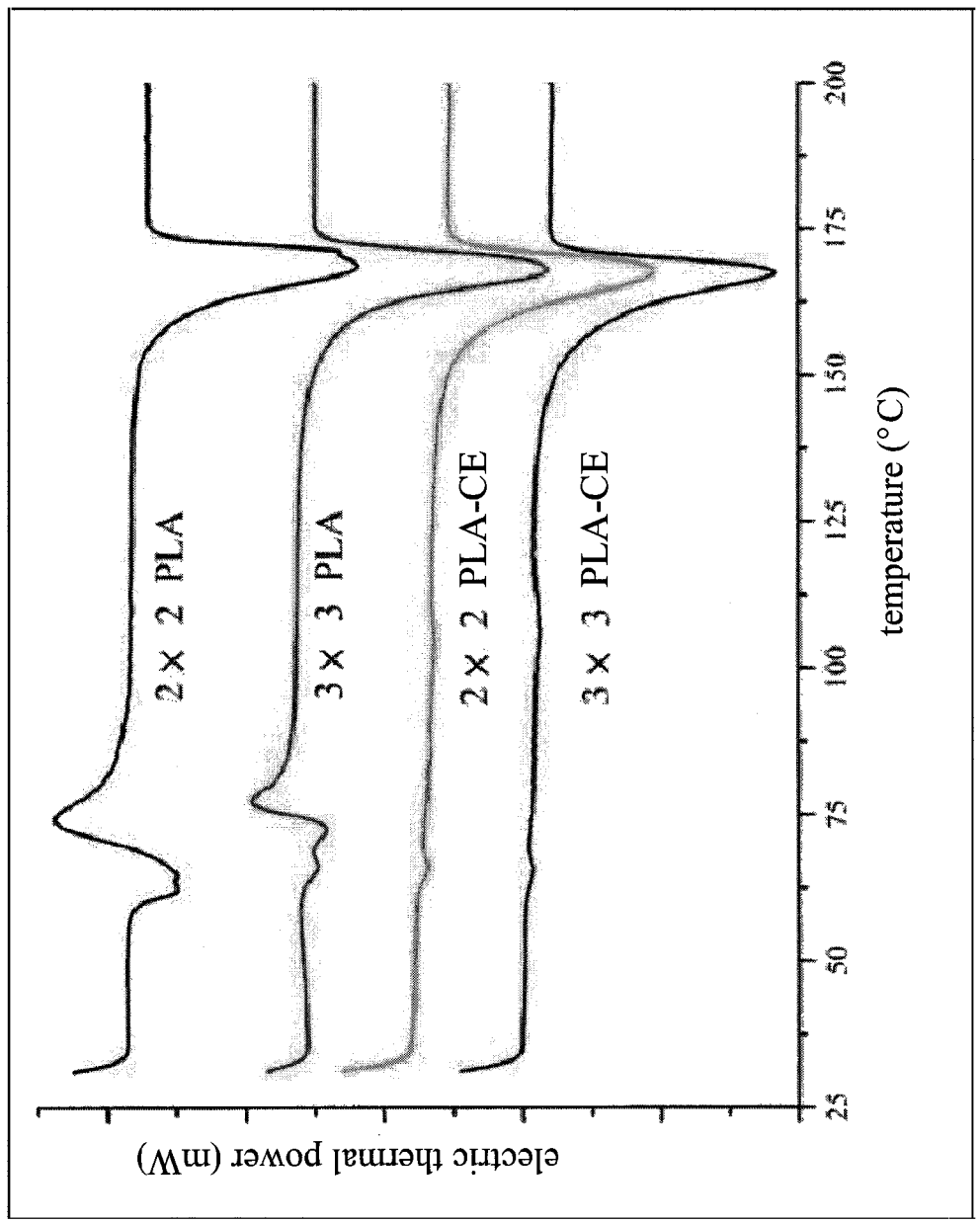
FIG. 5 shows DSC temperature rising curve of PLA extended films and PLA-CE extended films made from a biaxial oriented stretch process under isothermal crystallization at different temperatures.

Further, the DSC temperature rising curve of PLA extended films and PLA-CE extended films made from a uniaxial stepwise stretch process at an extending rate of 100%/second with different extending folds (3×1, 3×2 and 3×3) under isothermal crystallization at different temperatures are shown in FIG. 4, and the DSC temperature rising curve of PLA extended films and PLA-CE extended films made from a biaxial oriented stretch process at extending rate of 100%/second with different extending folds (3×2 and 3×3) under isothermal crystallization at different temperatures are shown in FIG. 5. From FIG. 4, it is found that the peak area of cold crystal is smaller if the extending fold is lower (3×1), and it is believed that the molecular segment will have an ordered arrangement under compression in a fixed space while the film is extended in uni-direction; reversely, the peak area of cold crystal is larger if the extending fold is higher (3×3), and it is believed that the molecular may be slowly relieved during the extending process and thus the mechanical strength of the extended film products may be comparatively lower.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An extended film, comprising:
   poly(lactic acid), and
   a block copolymer comprising:
   a first block having segments formed by a styrene repeating unit;
   a second block having segments formed by at least one repeating unit selected from the group consisting of acrylate repeating units and methacrylate repeating units; and
   a third block having segments formed by an ethylenical repeating unit having epoxy groups,
   wherein, the first block, the second block and the third block are connected by chemical bonds, and wherein the block copolymer comprises the structure represented by formula (I) or formula (II):

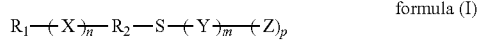
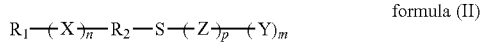

wherein $R_1$ represents a $C_1$-$C_8$ alkyl, $R_2$ represents a $C_2$-$C_6$ alkylene, X represents repeating units of the first block, Y represents repeating units of the second block, Z represents repeating units of the third block, n represents an integer of 10 to 30, m represents an integer of 10 to 100, and p represents an integer of 10 to 100.

2. The extended film of claim 1, wherein the styrene repeating units are formed by at least one monomer selected from the group consisting of styrene, a-methyl styrene, m-methyl styrene, o-methyl styrene, p-methyl styrene, o-ethyl styrene, p-ethyl styrene and p-tert-butyl styrene;
   the acrylate repeating units are formed by at least one monomer selected from the group consisting of methyl acrylate, ethyl acrylate, n-propyl acrylate, n-butyl acrylate, tert-butyl acrylate, n-hexyl acrylate, cyclohexyl acrylate, 2-ethylhexyl acrylate, lauryl acrylate, isobornyl acrylate, cyclododecyl acrylate, chloromethyl acrylate, 2-chloroethyl acrylate, 2-hydroxyethyl acrylate, 3-hydroxypropyl acrylate, 2,3,4,5,6-pentahydroxyhexyl acrylate, and 2,3; 4,5-tetrahydroxypentyl acrylate;
   the methacrylate repeating units are formed by at least one monomer selected from the group consisting of methyl methacrylate, ethyl methacrylate, n-propyl methacrylate, n-butyl methacrylate, tert-butyl methacrylate, n-hexyl methcrylate, cyclohexyl methacrylate, 2-ethylhexyl methacrylate, lauryl methacrylate, isobornyl methacrylate, cyclododecyl methacrylate, chloromethyl methacrylate, 2-chloroethyl methacrylate, 2-hydroxyethyl methacrylate, 3-hydroxypropyl methacrylate, 2,3,4,5,6-pentahydroxyhexyl methacrylate, and 2,3,4,5-tetrahydroxypentyl methacrylate; and
   the ethylenical repeating units having epoxy groups are formed by at least one monomer selected from the group consisting glycidyl acrylate, glycidyl methacrylate, glycidyl ethylacrylate and glycidyl itaconate.

3. The extended film of claim 1, herein the block copolymer comprises the structure represented by formula (III):

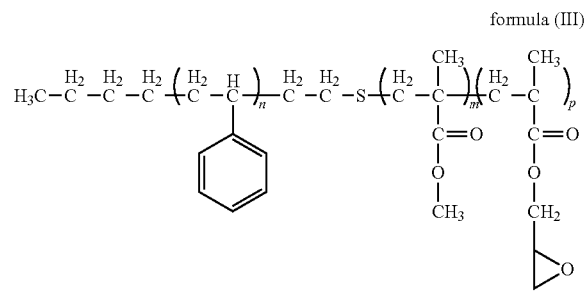

wherein n represents an integer of 10 to 30, m represents an integer of 10 to 100 and p represents an integer of 10 to 100.

4. The extended film of claim 1, wherein the extended film has a glass transition temperature of 90 to 112° C.

5. The extended film of claim 1, wherein the extended film has a transparency of 90 to 93%.

6. A method of manufacturing an extended film, comprising the steps of:
   mixing poly(lactic acid) and a block copolymer to form a mixture;
   compressing the mixture to form thin plate; and
   extending the thin plate to form the extended film,
   wherein the block copolymer comprises:
   a first block having segments formed by a styrene repeating unit;
   a second block having segments formed by at least one repeating unit selected from the group consisting of acrylate repeating units and methacrylate repeating units; and
   a third block having segments formed by an ethylenical repeating unit having epoxy groups, and
   the first block, the second block and the third block are connected by chemical bonds,
   wherein the block copolymer comprises the structure represented by formula (I) or formula (II):

wherein $R_1$ represents a $C_1$-$C_8$ alkyl, represents a $C_2$-$C_6$ alkylene, X represents repeating units of the first block, Y represents repeating units of the second block, Z represents repeating units of the third block, n represents an integer of 10 to 30, m represents an integer of 10 to 100, and p represents an integer of 10 to 100.

7. The method of claim 6, wherein a content of the block copolymer is between 0.5 to 5 weight % based on the total weight of the mixture.

8. The method of claim 6, wherein the thin plate is extended by a uniaxial stretch or biaxial stretch.

9. The method of claim 6, wherein the thin plate is extended by a uniaxial secondary stretch or biaxial oriented stretch.

10. The method of claim 6, wherein a length and width of the thin plate are each extended by 1 to 10 times.

11. The method of claim 6, wherein the extended film is extended at an extending temperature of 60 to 90° C.

12. The method of claim 6, wherein the extended film is extended at an extending rate of 10 to 70 cm/second.

13. The method of claim 8, wherein a thickness of the thin plate is between 0.1 to 10 mm.

14. The method of claim 6, wherein the styrene repeating units are formed by at least one monomer selected from the group consisting of styrene, a-methyl styrene, m-methyl styrene, o-methyl styrene, p-methyl styrene, o-ethyl styrene, p-ethyl styrene and p-tert-butyl styrene;

the acrylate repeating units are formed by at least one monomer selected from the group consisting of methyl acrylate, ethyl acrylate, n-propyl acrylate, n-butyl acrylate, tert-butyl acrylate, n-hexyl acrylate, cyclohexyl acrylate, 2-ethylhexyl acrylate, lauryl acrylate, isobornyl acrylate, cyclododecyl acrylate, chloromethyl acrylate, 2-chloroethyl acrylate, 2-hydroxyethyl acrylate, 3-hydroxypropyl acrylate, 2,3,4,5,6-pentahydroxyhexyl acrylate, and 2,3,4,5-tetrahydroxypentyl acrylate;

the methacrylate repeating units are formed by at least one monomer selected from the group consisting of methyl methacrylate, ethyl methacrylate, n-propyl methacrylate, n-butyl methacrylate, tert-butyl methacrylate, n-hexyl methcrylate, cyclohexyl methacrylate, 2-ethylhexyl methacrylate, lauryl methacrylate, isobornyl methacrylate, cyclododecyl methacrylate, chloromethyl methacrylate, 2-chloroethyl methacrylate, 2-hydroxyethyl methacrylate, 3-hydroxypropyl methacrylate, 2,3,4,5,6-pentahydroxyhexyl methacrylate, and 2,3,4,5-tetrahydroxypentyl methacrylate; and the ethylenical repeating units having epoxy groups are formed by at least one monomer selected from the group consisting glycidyl acrylate, glycidyl methacrylate, glycidyl ethylacrylate and glycidyl itaconate.

15. The method of claim 6, wherein the block copolymer comprises the structure represented by formula (III):

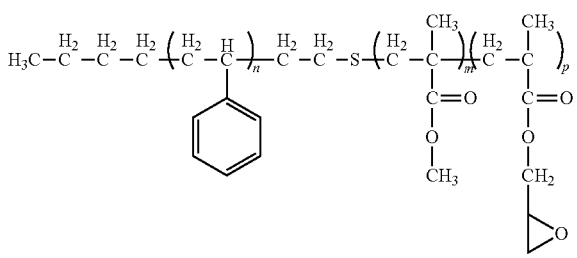

formula (III)

wherein n represents an integer of 10 to 30, m represents an integer of 10 to 100 and p represents an integer of 10 to 100.

* * * * *